(12) United States Patent
Linney

(10) Patent No.: US 8,107,504 B2
(45) Date of Patent: Jan. 31, 2012

(54) SYNCHRONISING SERIAL DATA SIGNALS

(75) Inventor: David W Linney, Coventry (GB)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 269 days.

(21) Appl. No.: 12/442,560

(22) PCT Filed: Oct. 27, 2006

(86) PCT No.: PCT/EP2006/010381
§ 371 (c)(1),
(2), (4) Date: Mar. 24, 2009

(87) PCT Pub. No.: WO2008/049451
PCT Pub. Date: May 2, 2008

(65) Prior Publication Data
US 2009/0316729 A1    Dec. 24, 2009

(51) Int. Cl.
*H04J 3/06* (2006.01)
(52) U.S. Cl. .................. 370/509; 370/516; 375/372
(58) Field of Classification Search ........... 370/503–514
See application file for complete search history.

(56) References Cited

U.S. PATENT DOCUMENTS

| | | | |
|---|---|---|---|
| 6,377,645 B1 * | 4/2002 | Chen et al. .................. 375/372 |
| 6,983,414 B1 | 1/2006 | Duschatko et al. | |
| 7,353,436 B2 * | 4/2008 | Taha et al. .................. 714/701 |
| 7,366,207 B1 * | 4/2008 | Vaishnav et al. ............... 370/509 |
| 7,454,537 B1 * | 11/2008 | Xue ................. 710/52 |
| 2003/0235215 A1 | 12/2003 | Carrel et al. | |
| 2005/0286507 A1 * | 12/2005 | sterling et al. ................ 370/363 |
| 2006/0039411 A1 | 2/2006 | Mukhopadhyay et al. | |
| 2007/0245213 A1 * | 10/2007 | Yoshida ........................ 714/758 |
| 2010/0226334 A1 * | 9/2010 | Ma et al. ....................... 370/329 |

FOREIGN PATENT DOCUMENTS

| | | |
|---|---|---|
| EP | 1211834 A2 | 6/2002 |
| EP | 1282248 A1 | 2/2003 |

* cited by examiner

*Primary Examiner* — Hassan Kizou
*Assistant Examiner* — Roberta A Shand
(74) *Attorney, Agent, or Firm* — Coats & Bennett, P.L.L.C.

(57) ABSTRACT

A method and apparatus for synchronising a serial data signal to a reference clock signal, the data signal comprising frames of equal length each comprising a known frame alignment word (FAW) and a payload, the frame alignment word being in a consistent position within each frame, the method comprising: storing the signal in a FIFO wander buffer as it is received in order to compensate for any wander that may occur; outputting the data signal stored in the FIFO wander buffer synchronised to the reference clock signal; searching for at least a portion of the frame alignment word in the data signal as it is received; and when it is determined that the frame alignment word has been found, realigning the data signal within the wander buffer. The step of realigning the data may comprise replacing at least a portion of the data signal in the wander buffer with a locally-held copy of at least a portion of the frame alignment word. The method may be used in any synchronous serial data stream, such as SDH or SONET.

16 Claims, 2 Drawing Sheets

SYNCHRONISING SERIAL DATA SIGNALS

FIELD OF THE INVENTION

The present invention relates to a method and circuit for synchronising a serial data signal to a reference clock signal, and especially but not exclusively to their application to SDH/SONET data streams.

BACKGROUND OF THE INVENTION

To achieve the data densities required in modern telecommunications equipment, internal data interfaces are now very high speed differential serial data with implicit clock and frame alignment. One approach requires that all data signals are synchronous to a system reference clock and frame signal that is distributed to all cards within a piece of equipment separately. Each receiving element requires a Clock Data Recoverer (CDR) which uses the edges in the incoming data to recover an independent receive clock, using the local system clock as a guide. The recovered clock and data are de-serialised and the content can then be aligned to the system frame.

Not all systems, or indeed all technologies (ASIC/FPGA, for example) provide a CDR function. For cost reasons, some systems or technologies only offer a "dynamic phase aligner" (DPA) in place of the CDR. The DPA does not supply the recovered clock signal, but adapts the incoming data to the system clock using a FIFO (first in, first out) memory. Thus, DPAs are only able to cope with a certain amount of "wander", where the bit transitions in the incoming signal are not correctly aligned with the system clock; this can be due to the inherent delays in transmission over a line, the delays through input or output buffers, noise, etc. These delays are temperature and supply dependent, so will vary over time.

The DPA provides a "wander buffer" using the area of FIFO memory in which it stores data before it is aligned with the system clock; in SDH/SONET systems it is common to have wander buffer capable of holding sufficient data to cope with a wander in either the fast or slow directions of 20 ns. However, given the cost implications of providing sufficient memory to do so, some manufacturers are only providing 2.5 ns of wander buffer in order to reduce costs.

A problem with this is that wander is cumulative; from a given device being brought into service it is generally only possible to track the maximum amount of wander so, if wander accrues in a single direction over a period of time, the wander buffer may fill and so data be lost. Generally, the only way to empty the wander buffer is to reset the equipment in question.

SUMMARY OF THE INVENTION

According to a first aspect of the present invention there is provided a method of synchronising a serial data signal to a reference clock signal, the data signal comprising frames of equal length each comprising a known frame alignment word (FAW) and a payload, the frame alignment word being in a consistent position within each frame, the method comprising:

storing the signal in a FIFO wander buffer as it is received in order to compensate for any wander that may occur;

outputting the data signal stored in the FIFO wander buffer synchronised to the reference clock signal;

searching for at least a portion of the frame alignment word in the data signal as it is received; and when it is determined that the frame alignment word has been found, realigning the data signal within the wander buffer.

Accordingly, this method takes account of the fact that the frame alignment is inherently found in the same position within each frame and so the wander buffer can be "reset" when it is found. This prevents data building up within the FIFO wander buffer and hence reduces the likelihood of an overflow occurring; wander need not be allowed to build up frame after frame. Only as much wander need be tracked as may occur as often as the method is repeated, which is typically every frame. Furthermore, no separate clock recovery device is required, thereby reducing the cost of implementing the method.

The step of realigning the data signal within the wander buffer may comprise replacing at least a portion of the data signal in the wander buffer with a copy of at least a portion of the frame alignment word. This takes advantage of the fact that the frame alignment word is generally known, and when the frame alignment word is detected it is not payload data in the wander buffer; the data in the wander buffer may be safely replaced with a copy of the frame alignment word. Indeed, the portion of the data replaced will typically comprise received frame alignment word only and not payload. This allows the amount of data stored within the wander buffer to be changed in order to realign the data within the buffer. Preferably, the data in the wander buffer is realigned to at least approximately half-fill the buffer.

As mentioned above, the position of the frame alignment word may be checked in every frame received. Accordingly, the method may comprise determining the position of the frame alignment word in a first frame, determining the likely position of the frame alignment word in the received data signal in subsequent frames and looking for the frame alignment word in the likely position in subsequent received frames. As the frame alignment word occurs in the same position in each frame, once its position in one frame has been determined its position in subsequent frames and hence in the data signal is easily apparent.

Indeed, the method may comprise searching for a reduced portion of the frame alignment word in the subsequent frames. Such strategies reduce the processing load required. However, it is still preferred to search for the whole, or a substantial portion of, the frame alignment word in the first frame, so as to avoid the detection of a mimic FAW; that is, a portion of the payload that coincidentally is identical to the true FAW. Once the frame alignment word has been detected it is less likely that a partial search in the correct place would be fooled by a mimic.

In a typical embodiment, the frame alignment word comprises a first portion comprising the same data sequence repeated a plurality of times, followed by second portion repeated a plurality of times. In such a case, the reduced portion of the FAW may comprise searching for the transition between the first and second portion; this is an easily recognisable change.

In the preferred embodiment, the data signal is a SDH or SONET data stream. This is particularly convenient when it is considered that SDH and SONET both have well defined frame alignment words.

According to a second aspect of the invention, there is provided a circuit for synchronising a serial data signal to a reference clock signal, the data signal comprising frames of equal length each comprising a known frame alignment word (FAW) and a payload, the frame alignment word being in a consistent position within each frame, comprising:

a data input and a data output;
a reference clock signal input;
a wander buffer comprising a FIFO memory;

a data aligner arranged to align, in use, a data signal input to the data input to a reference clock signal input to the reference clock signal input and to pass the aligned data signal to the data output, the data aligned being coupled to the wander buffer so as to store, in use the data signal during alignment so as to compensate for any wander in the data signal; and a frame alignment word detector arranged to detect the presence of the frame alignment word, in use, in the data signal;

in which the circuit is arranged so as to realign the data stored in the wander buffer once the frame alignment word detector detects the presence of the frame alignment word in the data signal.

The circuit may comprise a frame alignment word source, arranged such that when the circuit realigns the data stored in the wander buffer at least a portion of the frame alignment word in the data signal is replaced with a copy of the frame alignment word from the frame alignment word source. This takes advantage of the fact that the frame alignment word is generally known, and when the frame alignment word is detected it is not payload data in the wander buffer; the data in the wander buffer may be safely replaced with a copy of the frame alignment word. Indeed, the portion of the data replaced will typically comprise received frame alignment word only and not payload. This allows the amount of data stored within the wander buffer to be changed in order to realign the data within the buffer. Preferably, the data in the wander buffer is realigned to at least approximately half-fill the buffer.

The frame alignment word detector may be arranged so as to search for the frame alignment word in every frame received. It may have two states; a first state in which it searches for a first portion of the frame alignment word and determines the position of the frame alignment within the data signal within a given frame, and a second state which it enters after determining the position of the frame alignment word in the data signal in which it only searches for a second, reduced, portion of the frame alignment word but also predicts where the portion of the frame alignment word is likely to occur. As the frame alignment word occurs in the same position in each frame, once its position in one frame has been determined its position in subsequent frames and hence in the data signal is easily apparent.

Preferably, the circuit is arranged to carry out, in use, the method of the first aspect of the invention.

According to a third aspect of the invention, there is provided a network element comprising a plurality of circuits performing functions of the network element; and internal serial interfaces between the circuits; in which the circuits each comprise a circuit according to the second aspect of the invention coupled to an internal serial interface thereof.

BRIEF DESCRIPTION OF THE DRAWINGS

The present invention will be understood and appreciated more fully from the following detailed description of an embodiment of the invention taken in conjunction with the drawings in which.

DESCRIPTION OF AN EMBODIMENT OF THE INVENTION

Figure 1:
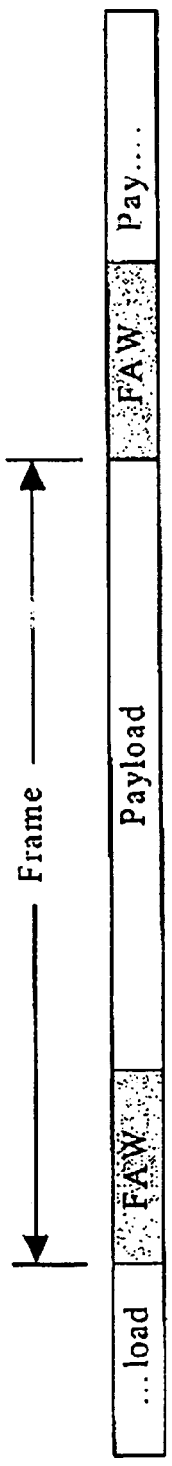
FIG. 1 is a diagram illustrating the frame structure of a serial data frame.

High speed serial interfaces rely on having a structured frame which includes a regularly repeating Frame Alignment Word (FAW). Each frame of the data stream can therefore be regarded as comprising the FAW and the payload as shown in FIG. 1 of the accompanying drawings. The data stream comprises many such frames in sequence. In the example of SDH or SONET, the FAW comprises a first portion comprising "F6" (depicted in hexadecimal) repeated 12 times followed by a second portion comprising "28" (depicted in hexadecimal) repeated 12 times.

Figure 2:
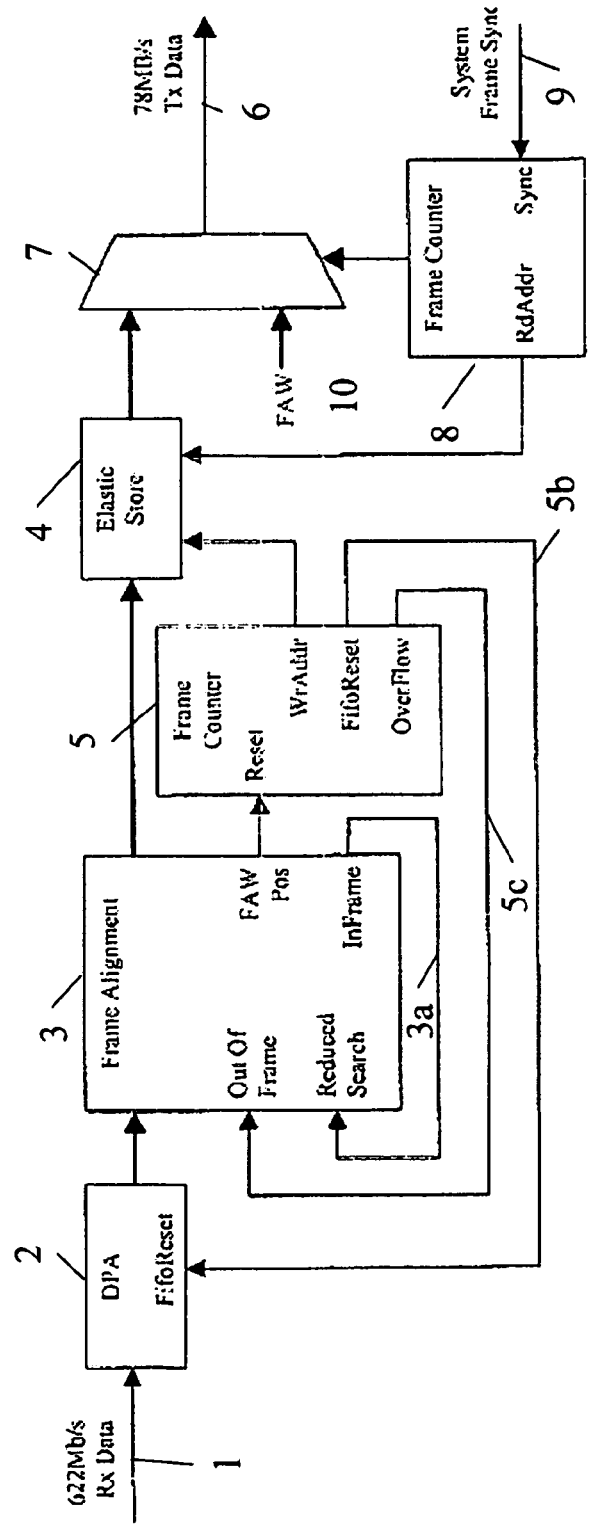
FIG. 2 is a diagram illustrating a block diagram of a circuit according to an embodiment of the present invention.
Figure 3:
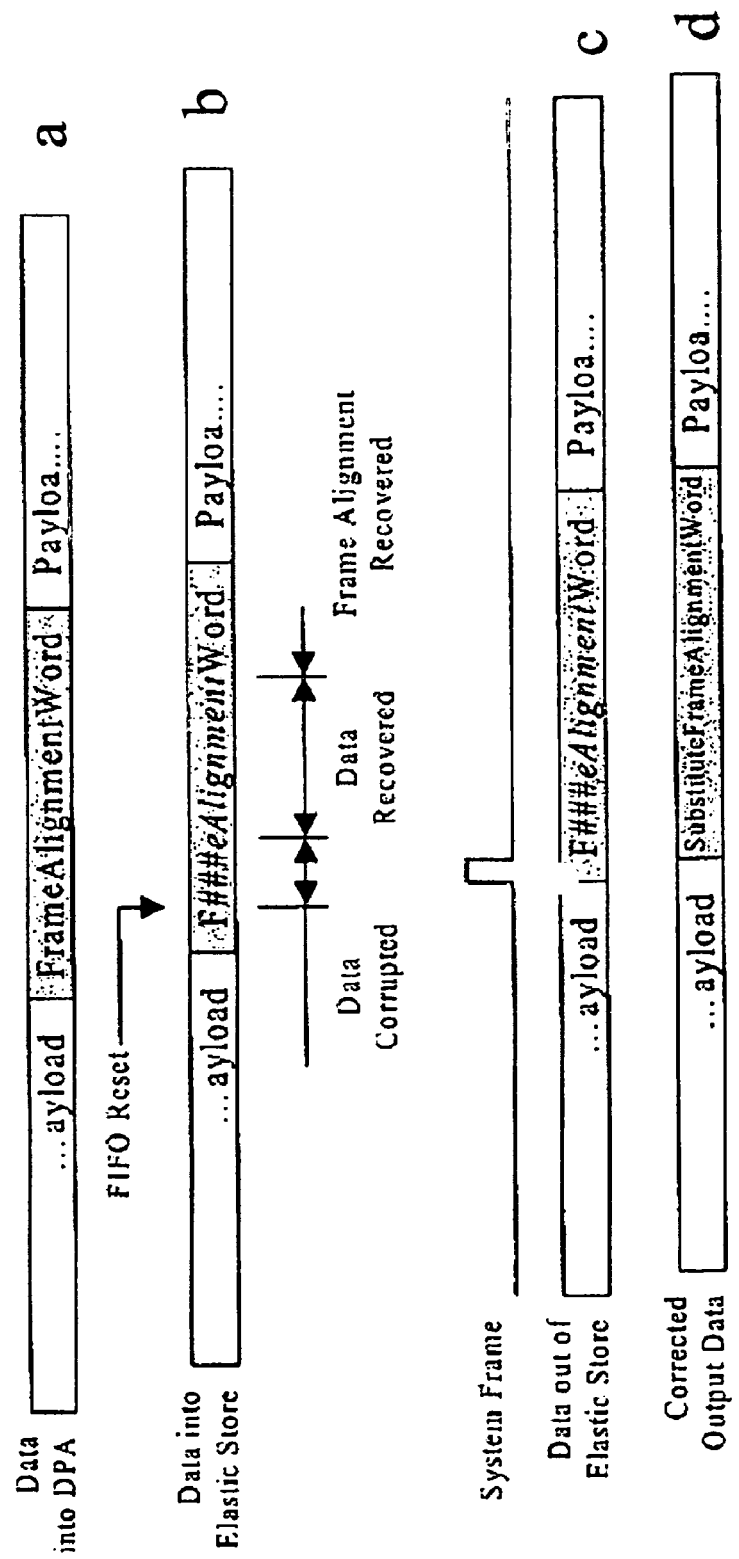
FIG. 3 is a diagram showing the changes made to the data signal as it passes through the circuit of FIG. 2.

This is made use of in the circuit shown in FIG. 2 of the accompanying drawings; the circuit forms an embodiment of the invention. A received data signal is received at an input 1 of the circuit. It is passed to a dynamic phase alignment (DPA) circuit 2, which chooses the optimum phase to sample the received data signal. The data as input to the DPA is shown in FIG. 3a. The output of this circuit is passed to Frame Alignment Word detector (FAW detector) 3, which searches for the FAW in the data signal.

The FAW detector 3 has two states. The first state—the "out of frame" state—in which the FAW detector starts up, searches the entire data stream for the entire FAW. Accordingly, once the FAW has been detected in this manner the FAW detector 3 can be reasonably certain that it has correctly located the FAW, and not a mimic, within a frame. Once the FAW has been detected in the out of frame state, the FAW detector can proceed into the second, "in-frame" state as it knows where subsequent FAWs are likely to occur. In this state, the FAW detector only searches through a window about the expected position and only searches for the transition "F628" between the first and second portions of the FAW. The FAW detector indicates to itself over data line 3a when this state has been entered.

The data signal is not changed by this search and passes through the FAW detector to a FIFO wander buffer 4, depicted as an elastic store. This stores the data signal until it is the appropriate time to write it to the output as will become apparent below. An input frame counter 5 keeps track of the progress of the writing of the current frame into the wander buffer 4, and from this determines the correct write address for the elastic store.

Early in the FAW, the FIFO within the DPA 2 is reset over line 5b. This will change the position of the FAW slightly within the recovered data, thus absorbing any wander that has occurred. The FAW detector 3 then locates the new position using the reduced FAW search. When it has located it, it indicates over line 3a that the FAW has been found the write address is reset to a standard position halfway through the wander buffer. Accordingly, the write position into the wander buffer is reset to realign the data stored within the wander buffer 4.

This realignment can be seen in FIG. 3b, where the FAW detector 3 has initiated a realignment and detected the presence of the FAW. This causes some corruption of the data stored in the wander buffer 4; this does not matter, as it is only ever the FAW that is corrupted. Furthermore, only a small portion—that indicated by ### in the drawing—is corrupted.

The frame counter also notes if more than a frame's worth of data has been written to the elastic store since the last realignment. If so, then the FAW detector must have missed a FAW, since they occur every frame and the frame counter 5 initiates a reset of the entire circuit over line 5c and the circuit restarts from its start up state.

Data from the wander buffer 4 is read out to an output 6 of the circuit through multiplexer 7. Read out of the data is controlled by an output frame counter 8, which is connected to an input 9 for a reference clock signal. This controls the read out of the data in the wander buffer 4 so that it is read out in synchronisation with the reference clock. The data read out from the wander buffer 4, together with its synchronisation to the system clock, is shown in FIG. 3c of the accompanying drawings. The output frame counter 8 controls the address from which the data is read out of the elastic store.

However, there is still corrupted data in the signal read out. This is corrected by use of a copy FAW store 10 also coupled to the multiplexer 7. The FAW store 10 replaces the FAW received in each frame with a locally-stored copy, identical to the FAW transmitted in use without the corruption introduced by the realignment process. This can be seen in FIG. 3d of the accompanying drawings; it is to be noted that the "substitute frame alignment word" depicted therein is identical to the "frame alignment word" of FIGS. 3a to 3c. The output of the circuit is therefore a parallel, realigned version of the input signal, identical in all other respects.

Accordingly, data signals received can be quickly and easily resynchronised to a reference clock signal, with a reduced requirement for the size of the wander buffer. The wander buffer need only be as big as the amount of wander/jitter that can occur in a single frame.

The invention claimed is:

1. A method of synchronizing a serial data signal to a reference clock signal, the serial data signal comprising frames of equal length, each frame including a known frame alignment word (FAW) and a payload, the frame alignment word being located in a consistent position within each frame, the method comprising:
   storing a data signal in a First-In-First-Out (FIFO) wander buffer as the data signal is received to compensate for wander;
   outputting the data signal stored in the FIFO wander buffer synchronized to a reference clock signal;
   searching for at least a portion of the frame alignment word in the data signal as the data signal is received; and
   realigning the data signal within the wander buffer responsive to determining that the frame alignment word has been found by replacing at least a portion of the data signal in the wander buffer with a copy of at least a portion of the frame alignment word.

2. The method of claim 1 wherein the copy of the portion of the frame alignment word is a locally stored copy of the frame alignment word.

3. The method of claim 1 wherein the portion of the data signal replaced in the wander buffer comprises only the received frame alignment word.

4. The method of claim 1 further comprising realigning the data signal in the wander buffer such that the data signal occupies approximately half the wander buffer.

5. The method of claim 1 further comprising checking a position of the frame alignment word in every frame received.

6. The method of claim 1 further comprising:
   determining a position of the frame alignment word in a first frame;
   determining a likely position of the frame alignment word in the received data signal in subsequent frames; and
   searching for the frame alignment word in the likely position in the subsequent frames.

7. The method of claim 6 further comprising searching for a reduced portion of the frame alignment word in the subsequent frames.

8. The method of claim 6 further comprising searching the first frame for one of the whole frame alignment word, and a substantial portion of the frame alignment word.

9. The method of claim 7 wherein the frame alignment word comprises a first portion that includes a first data sequence repeated a plurality of times, followed by a second portion that includes a second data sequence repeated a plurality of times, and wherein searching for the reduced portion of the frame alignment word comprises searching for the transition between the first and second portion.

10. The method of claim 1 wherein the data signal comprises at least one of an Synchronous Digital Hierarchy (SDH) data stream or a Synchronous optical networking (SONET) data stream.

11. A circuit for synchronizing a serial data signal to a reference clock signal, the serial data signal comprising one or more frames of equal length, each comprising at a known frame alignment word (FAW) and a payload, the frame alignment word being located in a consistent position within each frame, the circuit comprising:
   a data input and a data output;
   a reference clock signal input;
   a wander buffer comprising a First-In-First-Out (FIFO) memory, and communicatively coupled to the data output;
   a data aligner configured to:
      align a data signal that is input to the data input to a reference clock signal that is input to the reference clock signal input; and
      pass the aligned data signal via the wander buffer to the data output, the wander buffer operative to store the data signal during alignment processing to compensate for wander in the data signal; and
   a frame alignment word detector configured to detect the presence of a frame alignment word in the data signal;
   wherein the circuit is configured to realign the data stored in the wander buffer responsive to the frame alignment word detector detecting the presence of the frame alignment word in the data signal; and
   a frame alignment word source configured to replace at least a portion of the frame alignment word in the data signal with a copy of the frame alignment word from the frame alignment word source when the circuit realigns the data stored in the wander buffer.

12. The circuit of claim 11 wherein the frame alignment word detector is further configured to search for the frame alignment word in every frame received.

13. The circuit of claim 11 wherein the frame alignment word detector has two states, the states comprising:
   a first state in which the frame alignment word detector is configured to search for a first portion of the frame alignment word and determine a position of the frame alignment within the serial data signal within a given frame; and
   a second state in which the frame alignment word detector searches for a second, reduced portion of the frame alignment word and predicts where the portion of the frame alignment word is likely to occur, the frame alignment word detector entering the second state after determining the position of the frame alignment word in the first state.

14. The circuit of claim 11 wherein the circuit is further configured to process at least one of a Synchronous Digital Hierarchy (SDH) and a Synchronous optical networking (SONET) data stream as the data signal.

15. The circuit of claim 11 wherein the circuit is further configured to:

store the data signal in a First-In-First-Out (FIFO) wander buffer as the data signal is received to compensate for wander;
output the data signal stored in the FIFO wander buffer synchronized to the reference clock signal;
search for at least a portion of the frame alignment word in the data signal as the data signal is received; and
realign the data signal within the wander buffer responsive to determining that the frame alignment word has been found.

16. A network element comprising:
a plurality of circuits performing functions of the network element;
internal serial interfaces between the plurality of circuits; and
each of the plurality of circuits comprising:
  a data input and a data output;
  a reference clock signal input;
  a wander buffer comprising a First-In-First-Out (FIFO) memory, and communicatively coupled to the data output;
  a data aligner configured to:
    align a data signal that is input to the data input, to a reference clock signal that is input to the reference clock signal input; and
    pass the aligned data signal via the wander buffer to the data output, the wander buffer operative to store the data signal during alignment processing to compensate for wander in the data signal; and
  a frame alignment word detector configured to detect the presence of a frame alignment word in the data signal;
  wherein the circuit is configured to realign the data stored in the wander buffer responsive to the frame alignment word detector detecting the presence of the frame alignment word in the data signal; and
  a frame alignment word source configured to replace at least a portion of the frame alignment word in the data signal with a copy of the frame alignment word from the frame alignment word source when the circuit realigns the data stored in the wander buffer.

* * * * *